US005619084A

United States Patent [19]

Lau

[11] Patent Number: 5,619,084
[45] Date of Patent: Apr. 8, 1997

[54] PMDC ELECTRIC MOTOR WITH A MAGNET SPACER

[75] Inventor: James C.-S. Lau, North Point, Hong Kong

[73] Assignee: Johnson Electric S.A., Switzerland

[21] Appl. No.: 520,472

[22] Filed: Aug. 29, 1995

Related U.S. Application Data

[63] Continuation of Ser. No. 226,457, Apr. 12, 1994, abandoned.

[30] Foreign Application Priority Data

Apr. 14, 1993 [GB] United Kingdom .................. 9307671
Aug. 12, 1993 [GB] United Kingdom .................. 9316744

[51] Int. Cl.$^6$ .......................... H02K 23/04; H02K 1/17
[52] U.S. Cl. .......................................................... 310/154
[58] Field of Search ...................... 310/154, 91, 40 MM, 310/42, 239, 89, 90, 177, 51, 190

[56] References Cited

U.S. PATENT DOCUMENTS

| 3,165,654 | 1/1965 | Mabuchi | 310/154 X |
|---|---|---|---|
| 3,500,090 | 3/1970 | Baermann . | |
| 3,612,929 | 10/1971 | Volkrodt | 310/190 |
| 4,071,794 | 1/1978 | Schoen . | |
| 4,445,060 | 4/1984 | Ruhle | 310/154 |
| 4,587,449 | 5/1986 | West | 310/154 |
| 4,728,835 | 3/1988 | Baines | 310/239 |
| 4,748,358 | 5/1988 | Ruhle | 310/154 |
| 4,900,967 | 2/1990 | Amano | 310/239 |
| 4,933,582 | 6/1990 | Hata | 310/154 |
| 4,973,871 | 11/1990 | Bisantz . | |
| 5,008,578 | 4/1991 | Pace . | |
| 5,049,770 | 9/1991 | Gaeth | 310/89 |
| 5,281,881 | 1/1994 | Gentry | 310/42 |

FOREIGN PATENT DOCUMENTS

| 144004 | 11/1984 | European Pat. Off. . |
|---|---|---|
| 2587150 | 9/1986 | France . |
| 923477 | 6/1961 | United Kingdom . |
| 2149224 | 6/1985 | United Kingdom . |
| 2202383 | 9/1988 | United Kingdom . |
| 2209878 | 5/1989 | United Kingdom . |

*Primary Examiner*—Clayton E. LaBalle
*Attorney, Agent, or Firm*—Ostrolenk, Faber, Gerb & Soffen, LLP

[57] ABSTRACT

A permanent magnet direct current motor includes two annular rigid magnets which are held within a cylindrical casing by a spacer formed of a rigid mild steel insert. The rigid insert is disposed between two free edges of the magnets. An additional spacer in the form of a resiliently deformable "U"-shaped spring is disposed between a second set of two free edges of the magnets. The mild steel insert has two oppositely-directed lateral extensions disposed in contact with each of the magnets and the closed end of the casing to locate the magnets longitudinally within the casing. The insert also has a first locating member adjacent the open end of the casing for engagement with a second complementary locating member in an end cap for closing the open end of the casing to locate the end cap angularly relative to the casing and thereby provide optimal commutation. The complementary locating member may include an electrically conductive member which contacts the insert to provide an earth connection within the end cap. Moreover, the insert serves as a magnetic shunt between the magnets so that upon magnetization of the magnets, the axis of the magnetic field lies in a second plane spaced from the longitudinal axis in the direction towards the insert, thus reducing radial vibration of the rotor and noise during operation.

33 Claims, 3 Drawing Sheets

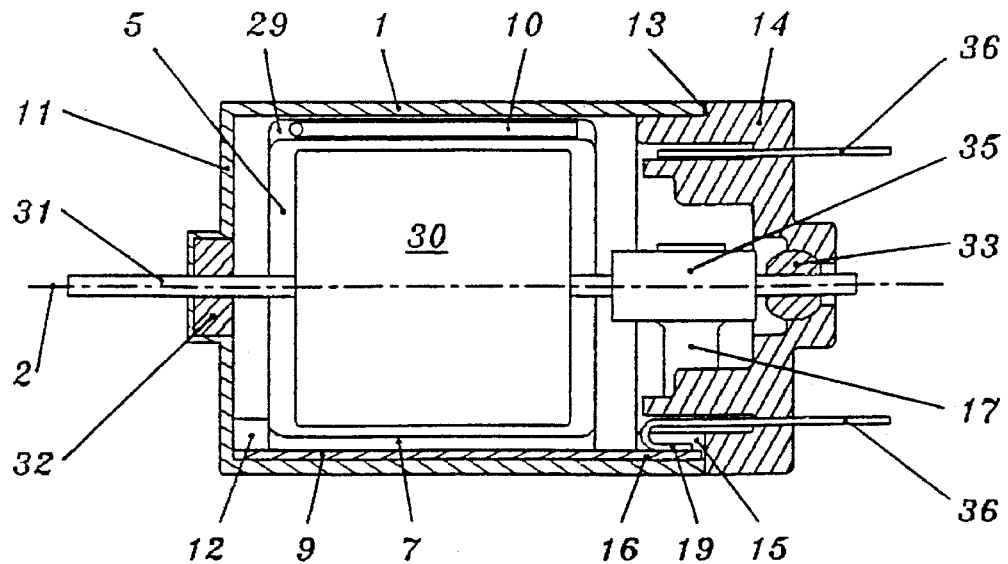
FIG.1
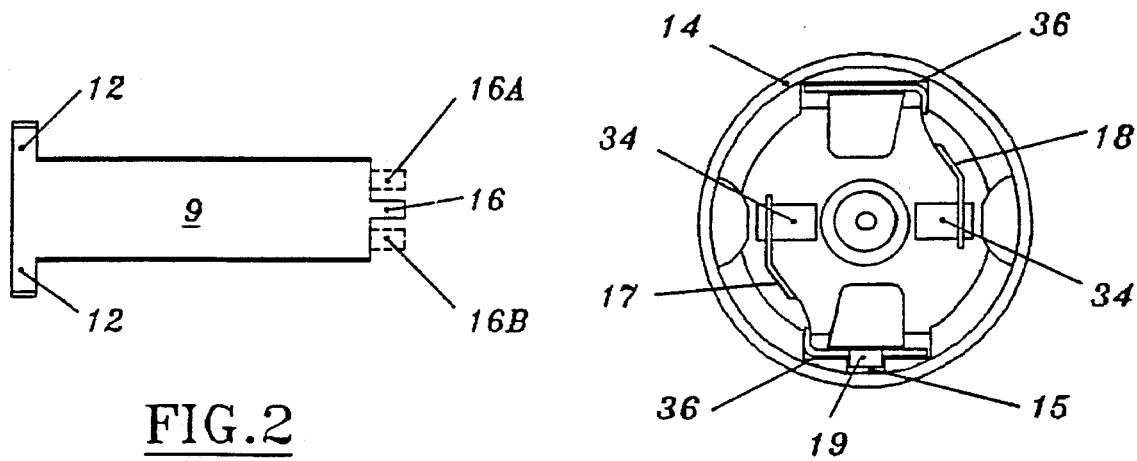
FIG.2
FIG.3
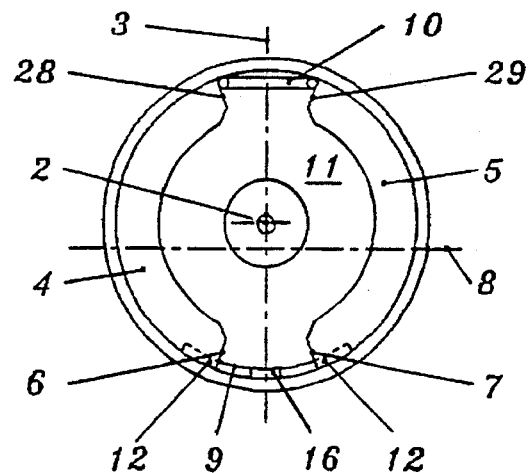
FIG.4

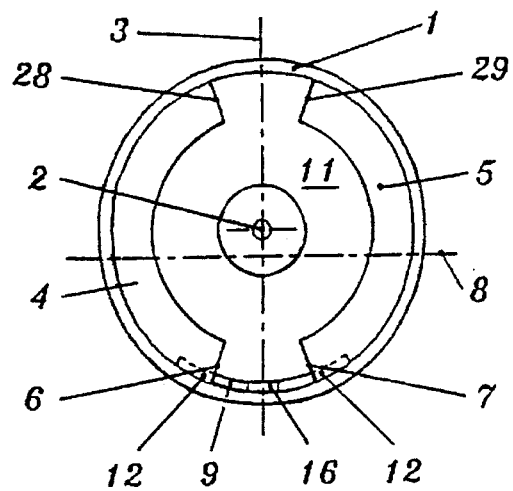
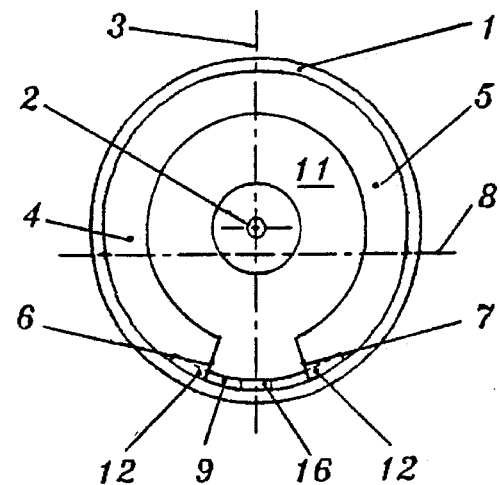
FIG.5  FIG.6
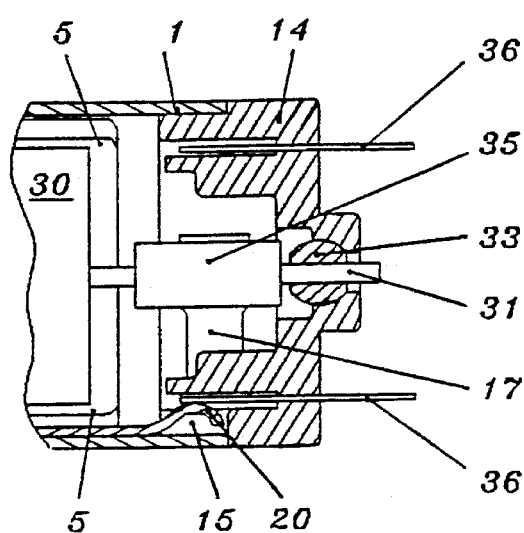
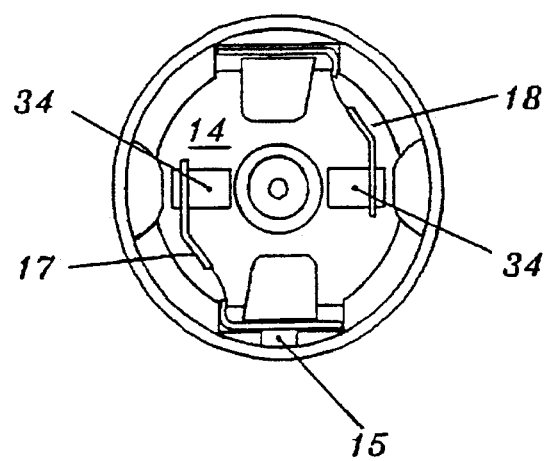
FIG.7  FIG.8

PMDC ELECTRIC MOTOR WITH A MAGNET SPACER

This is a Continuation of application Ser. No. 08/226,457 filed on Apr. 12, 1994 now abandoned.

FIELD OF THE INVENTION

This invention relates to permanent magnet direct current (PMDC) motors and in particular to a device for locating the magnets of PMDC motors.

BACKGROUND ART

A conventional PMDC motor comprises a casing having a longitudinal axis which lies in a plane of symmetry; permanent magnet means which are disposed within the casing symmetrically on opposite sides of the plane of symmetry, have at least two longitudinally extending free edges, and provide a magnetic field having an axis lying in a second plane which extends perpendicular to the plane of symmetry; and spacer means of different construction on opposite sides of the second plane, for locating the permanent magnet means angularly within the casing.

As disclosed in GB 2202383A, the spacer means may comprise two wings, pressed from the side wall of the casing on one side of the second plane, but this involves an additional stamping operation in the formation of the casing. Further operations are necessary to provide means for locating the permanent magnet means longitudinally within the casing. Thus, where tabs are pressed from the side wall to provide the longitudinal locating means, at least one further stamping operation is necessary.

DISCLOSURE OF THE INVENTION

One of the advantages of the preferred embodiments of the present invention is to simplify the production and assembly of PMDC motors.

The above advantage is achieved by providing a spacer unit which includes a rigid insert which extends, longitudinally, between the two free edges of a permanet magnet unit and, transversely, across the plane of the symmetry of the motor.

According to the preferred embodiments of the present invention, there is provided a PMDC motor comprising a casing which has a longitudinal axis which lies in a plane of symmetry. A permanent magnet unit disposed within the casing symmetrically on opposite sides of the plane of symmetry, has at least two longitudinally extending free edges and provides a magnetic field having an axis lying in a second plane which extends substantially perpendicular to the plane of symmetry. A spacer unit having a different construction on opposite sides of the second plane, includes a rigid insert which extends, longitudinally, between the two free edges and, transversely, across the plane of symmetry into engagement with the two free edges of the permanent magnet unit to locate the permanent magnet unit angularly within the casing.

In a preferred embodiment, where the casing has a closed end, the insert has two oppositely-directed lateral extensions respectively in contact with and disposed between an end face of the permanent magnet unit and the closed end of the casing to locate the permanent magnet unit longitudinally within the casing. This considerably simplifies positioning of the permanent magnet unit within the casing and obviates the need for repeated stamping operations in the formation of the casing.

In another advantageous construction, where an end cap is provided for closing an open end of the casing, the insert is provided with a first locating member adjacent the open end of the casing, and the end cap has a complementary second locating member, for engagement with the first locating members to locate the end cap angularly, relative to the casing. Thus, by providing inserts with locating member in different positions, for engagement with the second locating member provided in a circular section end cap fitted to a circular section casing, it is possible to vary the angular position of the end cap relative to the casing. The brushes carried by the end cap can therefore be positioned, accurately relative to the magnets, so as to optimize commutation.

The insert may be of insulating material, such as molded plastic. Alternatively, where the casing is metallic, the insert may be of conductive material, e.g. metal, and may engage the casing. In this case, the locating member in the end cap may constitute a recess and the first locating member may project into this recess to provide an earth connection within the end cap. In an alternative arrangement, the second locating member may comprise a projection and the first locating member may comprise a recess formed in the insert for receiving the projection. To provide an earth connection within the end cap, it is necessary to utilize locating member of conductive material or to provide an additional conductive element for this purpose.

Where the casing is metallic and the insert is of conductive material such as metal, the insert may be formed with a flat, longitudinally extending, central portion with two oppositely inclined side portions diverging from the central portion. The side portions may have parallel edges for engagement with the longitudinally extending free edges of the magnets, and the lateral extensions may comprise parts of the side portions which extend beyond the parallel edges.

In a motor incorporating such an insert, at least one aperture may be formed in the closed end of the casing and have an inwardly directed rim, and a locating portion extending from one end of the central portion may have a recess having a shape that is complementary to the shape of the rim and may engage the rim to position the insert within the casing.

As a further refinement, the insert may be of ferromagnetic material of low permeability to provide a magnetic shunt between the free edges of the permanent magnet unit (or, at least, to provide a more effective magnetic shunt than is provided on the other side of the second plane). As a result, when the permanent magnet unit is magnetized during the normal charging operation, following assembly of the permanent magnet unit within the casing, the magnetic flux is more concentrated on the insert side of the longitudinal axis so that the second plane containing the magnetic axis is also disposed on the same side of the longitudinal axis as the insert. As a result, the rotor is magnetically biased at all times towards the insert and the resultant radial displacement of the rotor can be utilized to reduce radial vibration of the rotor and thereby reduce noise during operation of the motor.

In one form of construction, the permanent magnet unit includes comprise two separate arcuate magnets and have two further longitudinally extending free edges. In this case, the spacer unit includes an additional spacer which engages and locates the two further longitudinally extending free edges and, where the magnets are of rigid material, such as sintered particulate material, the additional spacer is preferably resiliently deformable, to accommodate variations in spacing arising from slight irregularities in the size, shape and position of the magnets. Alternatively, where the magnets are of resiliently deformable material, such as magnetic rubber (i.e. rubber impregnated with particulate permanent magnet material), the additional spacer may comprise a rigid member which may have a shape similar to the shape of the rigid insert.

It is also possible to dispense with the additional spacer where the permanent magnet unit includes two separate magnets which are independently fastened to the inside of the casing, e.g. by gluing. In this case, the rigid insert constituting the spacer unit serves to locate the permanent magnets prior to their attachment to the casing and may also function in an auxiliary manner to provide angular location of the end cap, an earth connection within the end cap, and a magnetic shunt for the purpose of offsetting the magnetic axis.

In an alternative form of construction, where the permanent magnet means unit is formed of resiliently deformable material, the permanent magnet unit may comprise integral portions of a single, part-annular section magnet extending beyond a 180° angular arc. In this case, the rigid insert serves to hold the magnet in place so that the magnet need not be independently attached to the casing.

Preferred embodiments of the invention will now be described, by way of example only, with reference to the accompanying drawings.

BRIEF DESCRIPTION OF THE DRAWINGS

FIG. 1 is a sectional side elevation of a PMDC motor according to one embodiment the present invention;

FIG. 2 is a plan view of a rigid insert forming part of the motor shown in FIG. 1;

FIG. 3 is an internal end view of an end cap forming part of the motor shown in FIG. 1;

FIG. 4 is an internal end view of part of the motor shown in FIG. 1;

FIGS. 5 and 6 are internal end views, similar to FIG. 4, showing parts of two further motors according to an embodiment of the present invention;

FIGS. 7 and 8 are a partial sectional side elevation corresponding to FIG. 1 and an internal end view of the end cap corresponding to FIG. 3 showing a motor with a modified rigid insert;

DETAILED DESCRIPTION OF THE EMBODIMENTS

Figure 10:
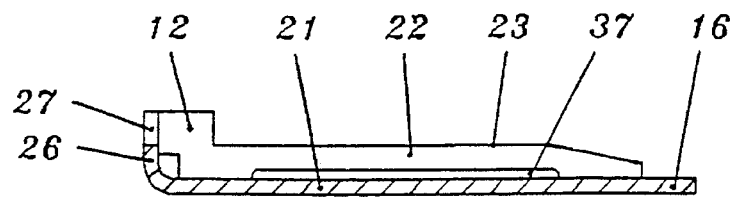
FIGS. 9, 10 and 11 are a plan view, a sectional side elevation and an end elevation of a further preferred form of rigid insert.

The casing 1 of the PMDC motor shown in FIG. 1 has a closed end 11 and an open end 13 which is closed by an insulating end cap 14 of molded plastics material. The rotor 30 has a shaft 31 which is journalled in bearings 32 and 33 mounted, respectively, in the closed end 11 of the casing and in the end cap 14.

Two sintered arcuate magnets 4 and 5 are symmetrically disposed within the casing 1 on opposite sides of a plane of symmetry 3 containing the longitudinal axis 2 of the casing 1, as shown in FIG. 4. A mild steel insert 9 extending transversely across the plane of symmetry 3 engages longitudinally extending free edges 6 and 7 of the magnets 4 and 5 so as to locate the magnets 4 and 5 angularly within the casing 1. A resiliently deformable "U"-shaped spacer 10 which, together with the insert 9, forms a spacer unit which engages two further longitudinally extending free edges 28 and 29 of the magnets 4 and 5, to hold the magnets 4 and 5 securely in position.

As shown in FIG. 2, the insert 9 has two oppositely directed lateral extensions 12 which are each disposed between and in contact with one of the magnets 4 and 5 and the closed end 11 of the casing 1 to thereby locate the magnets 4 and 5 longitudinally within the casing 1.

As shown in FIGS. 1 and 3, brushes 34 are carried by brush assemblies 17 and 18 for engaging a commutator 35 mounted on the shaft 31. Each brush assembly 17 and 18 has a terminal extension 36 which projects through a slot in the end cap 14. As shown in FIG. 2, the rigid insert 9 is provided with a first locating member in the form of a longitudinal extension 16. This extension engages with complementary second locating member formed in the molded plastic end cap 14 to angularly align the end cap with respect to the casing, which in turn ensures the desired alignment of the brushes with the magnets. The second locating member comprises a recess 15 which accommodates a resilient tab 19 formed on the brush assembly 17 for contacting the extension 16.

As shown in FIG. 1, the extension 16 of the first locating means is disposed adjacent the open end 13 of the casing 1 and prevents insertion of the end cap 14 into the casing 1 except at the angular orientation in which the recess 15 receives the extension 16.

As shown in FIG. 2, the extension 16 lies on the center line of the insert 9. This is for motors which can be driven in both directions. However, where the motor is required to run in only one direction, the extension 16 is disposed in one of the positions 16A and 16B, shown in broken outline, to vary the angular disposition of the end cap 14 and the brushes 34 relative to the magnets 4 and 5 to optimize commutation.

During production of the motor, after the magnets 4 and 5 have been positioned within the casing 1 by means of the insert 9 and an additional spacer in the form of a resilient "U"-shaped spring 10, the magnets 4 and 5 are magnetized in a charging operation in which the magnets are subjected to an intense magnetic field directed perpendicular to the plane of symmetry 3 along an axis passing through the longitudinal axis 2 of the motor. However, the mild steel insert 9 acts as a magnetic shunt which concentrates the magnetic field on the same side of the casing 1 as the insert 9, thus displacing the axis of the magnetic field away from the longitudinal axis 2 towards the insert 9 so as to lie in a second plane 8 perpendicular to the plane 3, as shown in FIG. 4. As a result, when an armature 30 is mounted within the casing 1, it is magnetically urged towards the insert 9. It can be arranged that this magnetic bias is sufficient to ensure that the shaft 31 always rotates in contact with the surfaces of the bearings 32 and 33 at a constant angular location. This reduces vibration of the shaft 31 within the bearings 32 and 33, known as bearing rattle, thus minimizing wear and noise. Further advantage may be gained if the motor is mounted with the magnetic biasing aligned with gravity to urge the shaft 31 into contact with the lowermost parts of the bearing surfaces.

In a further preferred embodiment, shown in FIG. 5, the magnets 4 and 5 comprise strips of magnetic rubber which are adhesively fastened to the inside surface of the casing 1. As shown, a rigid insert 9 constituting the spacer unit is disposed between longitudinally extending free edges 6 and 7 of the magnets 4 and 5 to locate the magnets 4 and 5 while they are adhesively fastened to the casing 1. Although not shown, an additional spacer may be disposed between two further longitudinally extending free edges 28 and 29 of the magnets 4 and 5. In this case, the additional spacer may be a rigid spacer which engages the magnets 4 and 5 with an interference fit because interference can be easily accommodated by minor local deformation of the rubber magnets 4 and 5.

In the embodiment shown in FIG. 6, a single strip of magnetic rubber is mounted within the casing 1 to form a single magnet of part-annular cross-section extending angularly more than 180°. A mild steel insert 9, identical with that shown in FIG. 4, is mounted between longitudinally extending free edges 6 and 7 of the magnet. The magnet comprises two integral portions forming a symmetrically disposed magnet unit including elements 4 and 5 which function in practically the same manner as the two magnets 4 and 5 of the preferred embodiment shown in FIG. 5. However, in the latter case, installation of the magnet unit is simplified in that they are portions of a single piece of magnetic rubber which are integral with an intermediate portion which serves as an additional spacer. It is therefore possible to hold this piece of rubber in place by means of the insert 9, without having to glue or otherwise attach the piece of rubber to the casing 1.

In the preferred embodiments illustrated in FIGS. 1 to 6, the rigid insert 9 is of arcuate cross-section which conforms to the internal surface of the casing 1. However, flat or planar inserts may be used instead, particularly where the insert is not required to provide an electrical connection between the casing 1 and the end cap.

A modified insert 9 is utilized in the preferred embodiment illustrated in FIGS. 7 and 8. Here, the extension 16 on the insert 9 is provided with a resilient tab 20 in the form of an upwardly offset convexity which engages the brush assembly 17 within the recess 15 of the second locating member provided on the end cap 14. In this case, the brush assembly 17 is identical with the brush assembly 18. The insert 9 can therefore be provided in an electric motor with conventional brush assemblies.

Figure 11:
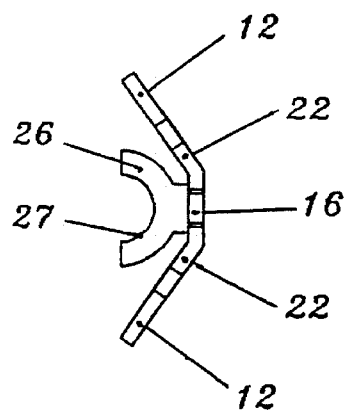
Figure 9:
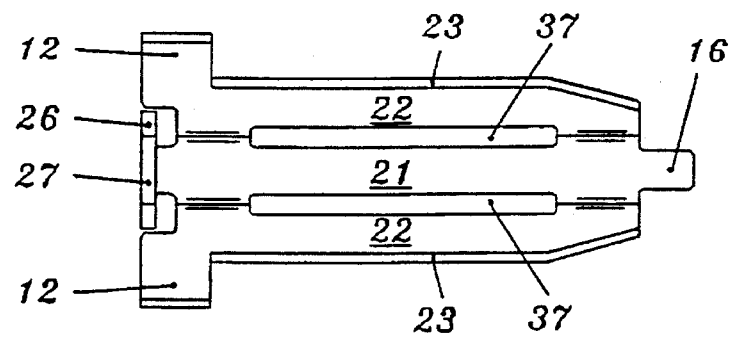

The insert 9 shown in FIGS. 9 to 11 is similar to the insert 9 shown in FIG. 2, but is formed in a two-stage stamping operation so as to be provided with a flat central portion 21, two oppositely inclined side portions 22 diverging from the central portion 21, a locating portion 26 extending perpendicularly from one end of the central portion 21, and a longitudinal extension 16 projecting from the other end of the central portion 21. To facilitate bending of the insert 9, to form the divergent side portions 22, slots 37 are formed in the body of the insert during the first stage of the stamping operation.

Figure 12:
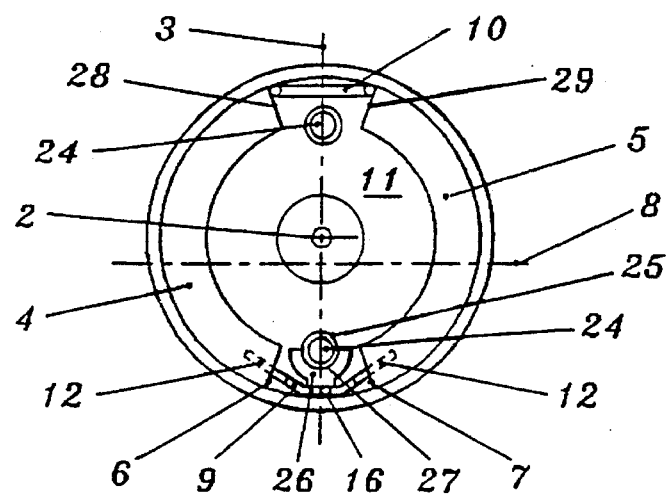
FIGS. 12 is an internal view, similar to FIG. 4, showing parts of a PMDC motor fitted with the rigid insert of FIGS. 9 to 11.

As shown in FIG. 9, the side portions 22 have parallel edges 23, extending throughout most of their length, for engagement with the longitudinally extending free edges 6 and 7 of the magnets 4 and 5, as shown in FIG. 12. However, at one end of the insert 9, the side portions 22 extend beyond the edges 23 to provide the lateral extensions 12 for separating the ends of the magnets 4 and 5 from the closed end 11 of the casing 1. Thus, by providing the lateral extensions 12 and the edges 23 on divergent side portions 22, the lateral extensions 12 and the edges 23 are spaced radially inwards of the casing 1 and engage the magnets 4 and 5 more securely, away from the corners of the magnets 4 and 5. As shown in FIGS. 9 and 10, the other end of the insert 9 is tapered to facilitate insertion of the magnets 4 and 5 into the casing 1.

In the preferred embodiment shown in FIG. 12, ventilation or mounting apertures 24 are stamped in the closed end 11 of the casing 1 and have inwardly directed rims 25. The rim 25 of one of these apertures 24 is engaged by a recess 27, of complementary shape to the rim 25, in the locating portion 26 of the insert 9, to position the insert 9 within the casing 1. As shown, the apertures 24 and rims 25 are both circular and the recess 27 is part-circular. However, non-circular shapes may be used.

I claim:

1. A permanent magnet direct current motor comprising:

a casing having a longitudinal axis which lies in a plane of symmetry;

a permanent magnet unit disposed within the casing on opposite sides of the plane of symmetry, the permanent magnet unit having at least two permanent magnets each having longitudinally extending edges, the at least two permanent magnets being arranged such that a first longitudinally extending edge of one of the at least two permanent magnets is disposed adjacent to a first longitudinally extending edge of the other of the at least two permanent magnets to form a first pair of adjacent longitudinally extending edges and a second longitudinally extending edge of one of the at least two permanent magnets is disposed adjacent to a second longitudinally extending edge of the other of the at least two permanent magnets to form a second pair of adjacent longitudinally extending edges, the at least two permanent magnet providing a magnetic field having an axis lying in a second plane which extends substantially perpendicular to the plane of symmetry; and a spacer unit including first and second spacer members disposed on opposite sides of the second plane, for locating the permanent magnet unit angularly within the casing, each of the first and second spacer members having a shape and a structure that is different from the other of the first and second spacer members; wherein the first spacer member comprises at least one rigid insert which extends, longitudinally, between and in engagement with the first pair of adjacent longitudinally extending edges of the at least two permanent magnets and, transversely, across the plane of symmetry, and the second spacer member comprises a resilient insert which extends longitudinally, between and in engagement with the second pair of adjacent longitudinally extending edges of the at least two permanent magnets, the first and second spacer members being formed separately from the casing.

2. A motor, according to claim 1, wherein the casing has a closed end and the at least one rigid insert has two oppositely-directed lateral extensions respectively in contact with and disposed between an end face of the permanent magnet unit and the closed end of the casing to locate the permanent magnet unit longitudinally within the casing.

3. A motor, according to claim 2, wherein the casing has an open end, an end cap is provided for closing the open end of the casing; the at least one rigid insert includes a first locating member disposed adjacent the open end of the casing and a second locating member is provided on the end cap and arranged to engage the first locating member to locate the end cap angularly, relative to the casing.

4. A motor, according to claim 3, wherein the casing is metallic;

the at least one rigid insert is conductive and engages the casing;

the second locating member comprises a recess in the end cap; and the first locating member projects into the recess and is arranged to provide an earth connection within the end cap.

5. A motor, according to claim 4, wherein two brush assemblies are mounted in the end cap; and one of the brush assemblies is provided with a resilient tab for engagement with the first locating member provided on the at least one rigid insert.

6. A motor, according to claim 4, wherein two brush assemblies are mounted in the end cap; and the first locating member is provided with a resilient tab for engagement with one of the two brush assemblies.

7. A motor, according to claim 4, wherein the at least one rigid insert comprises ferromagnetic material for forming a magnetic shunt between one of the first and second pairs of adjacent longitudinally extending edges of the permanent magnet unit; and the second plane, containing the axis of the magnetic field, is disposed spaced from the longitudinal axis of the casing in a direction towards the at least one rigid insert.

8. A motor, according to claim 4, wherein the at least one rigid insert has a flat, longitudinally extending, central portion, two side portions and two lateral extensions, the two side portions being oppositely inclined and diverging from the central portion and having substantially parallel edges for engagement with the first pair of adjacent longitudinally extending edges of the permanent magnet unit and the two lateral extensions respectively comprising parts of the side portions which extend beyond the substantially parallel edges of the side portions.

9. A motor, according to claim 8, wherein at least one aperture is located in the closed end of the casing and has an inwardly directed rim; and a locating portion extending substantially perpendicularly from one end of the central portion of the at least one rigid insert has a recess of complementary shape to the inwardly directed rim and engages the inwardly directed rim to position the at least one rigid insert within the casing.

10. A permanent magnet direct current motor, comprising:

a casing having an open end, a closed end and a longitudinal axis which lies in a plane of symmetry;

a permanent magnet unit disposed within the casing, extending on opposite sides of the plane of symmetry and providing a magnetic field with an axis lying in a second plane which extends substantially perpendicular to the plane of symmetry, the permanent magnet unit including at least one pair of adjacent longitudinally extending edges;

an end cap supporting at least one brush assembly and closing the open end of the casing;

a rotor disposed within the casing, in the magnetic field and journaled on bearings supported by the end cap and the closed end of the casing;

at least one spacer insert disposed between the at least one pair of adjacent longitudinally extending edges, the at least one spacer insert having a projection for engaging a recess formed in the end cap to angularly locate the end cap relative to the casing.

11. A permanent magnet direct current motor as claimed in claim 10, wherein the projection provided on the at least one spacer insert includes a resilient tab arranged to engage the at least one brush assembly within the recess formed in the end cap.

12. A permanent magnet direct current motor as claimed in claim 40, wherein the at least one brush assembly includes a resilient tab arranged to engage with the projection provided on the at least one spacer insert.

13. A permanent magnet direct current motor as claimed in claim 10, further comprising a biasing member for urging the at least one pair of adjacent longitudinally extending edges of the permanent magnet unit into contact with the at least one spacer insert.

14. A permanent magnet direct current motor as claimed in claim 10, wherein the permanent magnet unit includes at least two permanent magnets arranged to form first and second pairs of adjacent longitudinally extending edges, the at least one spacer insert includes at least two spacer members, one of the at least two spacer members being disposed between the first pair of adjacent longitudinally extending edges and the other of the at least two spacer members being disposed between the second pair of adjacent longitudinally extending edges.

15. A permanent magnet direct current motor comprising:

a casing having a longitudinal axis lying in a plane of symmetry;

at least one permanent magnet located in the casing and having at least two longitudinally extending edges, the at least one permanent magnet forming a magnetic field having an axis lying in a second plane which extends substantially perpendicular to the plane of symmetry; and a spacer for accurately positioning the magnet in the casing, the spacer being adapted and located to concentrate the magnetic field created by the at least one permanent magnet at a location spaced from the longitudinal axis of the casing.

16. The motor of claim 15, wherein the at least one permanent magnet comprises a ring shaped magnet extending beyond a 180° arc.

17. The motor of claim 15, wherein the spacer comprises a mild steel insert which forms a magnetic shunt for displacing the magnetic field from the longitudinal axis of the casing.

18. The motor of claim 15, wherein the at least one permanent magnet is a first permanent magnet, the motor further comprising a second permanent magnet, the spacer being located between edges of the first and second permanent magnets to position the first and second permanent magnets in the casing.

19. The motor of claim 18, wherein the spacer comprises a rigid insert located between first edges of the first and second permanent magnets and a resilient insert located between second edges of the first and second permanent magnets.

20. A permanent magnet direct current motor comprising:

a casing having a longitudinal axis;

a rotor having a rotor shaft and being rotatable within the casing;

a plurality of bearings for supporting the rotor shaft;

at least one magnet for forming a magnetic field; and a shunt forming member for forming a magnetic shunt to bias the magnetic field away from the longitudinal axis of the casing.

21. The motor of claim 20, wherein the shunt forming member is adapted and located to displace the magnetic field created by the at least one magnet so that the rotor shaft rotates in contact with the bearings at a substantially constant angular position.

22. The motor of claim 20, wherein the shunt forming member is adapted and located to bias the magnetic field in such a manner that the rotor shaft remains in contact with a lowermost surface of each of the bearings.

23. The motor of claim 20, wherein the at least one magnet has spaced end surfaces and the shunt forming member comprises a spacer located between the end surfaces of the at least one magnet for locating the at least one magnet in the casing.

24. The motor of claim 20, wherein the shunt forming member comprises a rigid insert formed of steel.

25. The motor of claim 20, wherein the at least one magnet is a first magnet, the motor further comprising a second magnet and a spacer located between first ends of the first ahd second magnets, the shunt forming member being located between second ends of the first and second magnets.

26. A permanent magnet direct current motor comprising:
   a casing having an open end, a closed end and a shaft extending along a longitudinal axis, the casing including at least one aperture located in the closed end of the casing and having an inwardly directed rim;
   a rotor having a commutator disposed on the shaft;
   at least one permanent magnet located in the casing and having at least two longitudinally extending edges, the at least one permanent magnet forming a magnetic field;
   a spacer located between the at least two longitudinally extending edges for accurately positioning the at least one magnet in the casing, the spacer having a locating member arranged to engage with the inwardly directed rim to position the spacer within the casing;
   a plurality of brushes located to be engageable with the commutator.

27. The motor of claim 26, wherein the spacer comprises a rigid insert.

28. The motor of claim 26, wherein the spacer is adapted and located to form a magnetic shunt for displacing the magnetic field formed by the at least one permanent magnet from the longitudinal axis of the casing.

29. The motor of claim 26, further comprising an end cap for covering the open end of the casing, wherein the spacer includes a longitudinal extension having a resilient tab arranged to force one of the plurality of brushes into electrical contact with the casing and the end cap has a recess formed therein for receiving the longitudinal extension of the spacer to locate the end cap in a desired angular position relative to the casing so that the plurality of brushes are accurately positioned relative to at least one permanent magnet.

30. The motor of claim 26, wherein the at least one permanent magnet is a first permanent magnet and the spacer is a first spacer formed by a rigid insert, the motor further comprising a second permanent magnet and a second spacer formed of a resilient material, the first spacer being located between first ends of the first and second permanent magnets, the second spacer being located between second ends of the first and second permanent magnets.

31. A permanent magnet direct current motor comprising:
   a casing having a longitudinal axis disposed in a plane of symmetry;
   a rotor having a rotor shaft and being rotatable within the casing;
   a plurality of bearings for supporting the rotor shaft;
   a permanent magnet unit comprising a rubber magnetic material and disposed within the casing, the permanent magnet unit having a pair of longitudinally extending adjacent edges and providing a magnetic field, the magnetic field provided by the permanent magnet unit having an axis lying in a second plane which is substantially perpendicular to the plane of symmetry;
   a spacer unit being located between the pair of longitudinally extending adjacent edges of the permanent magnet unit for locating the permanent magnet unit within the casing, the spacer unit comprising an insert member having a rigidity that is substantially greater than a rigidity of the rubber magnetic material of the permanent magnet unit, the spacer unit being adapted and arranged to create a magnetic shunt that displaces the magnetic field generated by the permanent magnet unit away from the longitudinal axis of the casing.

32. The motor of claim 31, wherein the permanent magnet unit comprises a single ring shaped magnet.

33. The motor of claim 31, wherein the permanent magnet comprise at least two C-shaped magnets.

* * * * *